United States Patent [19]

Frye

[11] 4,271,912
[45] Jun. 9, 1981

[54] DISC HARROW

[75] Inventor: John V. Frye, Dallas County, Tex.

[73] Assignee: Ag-Team, Inc., Rowlett, Tex.

[21] Appl. No.: 154,922

[22] Filed: May 30, 1980

Related U.S. Application Data

[63] Continuation of Ser. No. 953,796, Oct. 23, 1978, abandoned.

[51] Int. Cl.³ ............................................ A01B 59/043
[52] U.S. Cl. ................................... 172/441; 172/595
[58] Field of Search ............... 172/440, 441, 442, 454, 172/455, 587, 595, 579

[56] References Cited

U.S. PATENT DOCUMENTS

| | | | |
|---|---|---|---|
| 1,247,017 | 11/1917 | Sharp | 172/595 X |
| 2,320,015 | 5/1943 | Seaholm | 172/595 X |
| 2,609,647 | 9/1952 | Love | 172/595 |
| 2,617,342 | 11/1952 | Meissner | 172/595 |
| 2,640,307 | 6/1953 | Robertson | 172/595 |
| 2,683,960 | 7/1954 | Love | 172/595 |
| 2,704,018 | 3/1955 | Oehler | 172/595 |
| 2,723,613 | 11/1955 | Walberg | 172/595 |
| 2,741,967 | 4/1956 | Oehler | 172/595 |
| 2,774,206 | 12/1956 | Lynch | 172/595 |
| 2,813,389 | 11/1957 | Padrick | 172/595 |
| 2,905,255 | 9/1959 | Kampe | 172/595 |
| 2,955,664 | 10/1960 | Oehler | 172/595 |
| 3,021,907 | 2/1962 | Lapins | 172/595 |
| 3,213,946 | 10/1965 | Carrick | 172/595 |
| 3,730,280 | 5/1973 | Oelschlaeger | 172/595 |
| 3,734,199 | 5/1973 | Tsuchiya | 172/551 |
| 3,912,017 | 10/1975 | Rehn | 172/328 |

FOREIGN PATENT DOCUMENTS

| | | | |
|---|---|---|---|
| 1208600 | 9/1959 | France | 172/595 |
| 789061 | 1/1958 | United Kingdom | 172/441 |

OTHER PUBLICATIONS

Miller Category I8II 3-Point Tandem Discs for America's Specialty Farms, Miller Mfg. Co., Stratton, Neb.

Primary Examiner—Richard J. Johnson
Attorney, Agent, or Firm—Richards, Harris & Medlock

[57] ABSTRACT

An improved disc harrow (10) for cutting and leveling soil comprises a rigid frame (14) having a front pair of gang assemblies (36, 38) and a rear pair of gang assemblies (62, 64) secured thereto. The disc gang assemblies (36, 38, 62 and 64) are arranged in double-offset relationship. The forward pair of disc gang assemblies (36, 38) extend laterally outward from points located on opposite sides of a longitudinal line to effect harrowing across the entire width of the invention without leaving an uncut balk.

12 Claims, 4 Drawing Figures

DISC HARROW

CROSS-REFERENCE TO RELATED APPLICATION

This application is a continuation of co-pending application Ser. No. 953,796 filed Oct. 23, 1978, abandoned.

TECHNICAL FIELD

The present invention relates generally to a cultivating implement. More particularly, this invention concerns an improved disc harrow of the tandem type having double-offset gangs of discs to achieve harrowing across the entire width of the implement without leaving a center balk.

BACKGROUND ART

Preparation of the soil comprises a very important part of a farming operation. Although natural factors are the ultimate determinants, the soil must be properly prepared in order for the planting to be successful. The soil or land is usually prepared in two stages. First, a plow is utilized to cut, lift and turn over the soil. However, plowing leaves a field in a relatively coarse condition which may be unsuitable for the seeding of some crops. Harrowing comprises the second typical stage of soil preparation. A disc harrow is utilized to further pulverize the soil and leave the field in a relatively smooth and level condition for planting.

A popular type of field harrow is the tandem disc harrow, which comprises front and rear pairs of disc gangs. The prior art includes several examples of such tandem disc harrows, many having the common disadvantage of leaving an uncut center balk of unharrowed zone with each pass of the implement. Some of the disc harrows of the prior art are either unadjustable or only adjustable with considerable difficulty. In addition, some of the prior disc harrows have tended to be of unnecessarily complex construction requiring more maintenance and resulting in greater expense. Heretofore, disc harrows suitable for field use have been of the pull type only and have thus been difficult to control and maneuver when drawn by a tractor. There is thus a need for an improved disc harrow of the tandem type which effects harrowing and leveling across the entire width thereof without leaving a center balk.

DISCLOSURE OF THE INVENTION

The present invention comprises an improved disc harrow which overcomes the foregoing and other problems associated with the prior art. In accordance with the broader aspects of the invention, there is provided a disc harrow of the tandem type featuring double-offset gangs of discs. The disc harrow herein can be employed for primary or secondary tillage of a field, and is adapted for use with a 3-point hitch. Cutting and leveling of the soil is effected across the entire width of the implement without leaving an unharrowed zone or center balk. Besides greater effectivity, the disc harrow of the present invention also features more simplified and rugged construction for ease of maintenance and adjustment.

In accordance with more specific aspects of the invention, a novel disc harrow of the tandem type includes a rectangular frame having a longitudinally extending intermediate member. A suitable hitch, such as a 3-point type hitch, is mounted on the frame for connecting the harrow to a tractor. Front and rear pairs of gang assemblies are secured to the frame in a double-offset relationship. The forward pair of gang assemblies overlap at the inner ends so that soil is harrowed across the entire width of the implement. Each gang assembly comprises a plurality of spaced discs, and is preferably pivotally secured to the frame for adjustable angular relationship therewith. If desired, a plurality of moldboard type scrapers can be included in each gang assembly for adjustable association with the discs.

BRIEF DESCRIPTION OF DRAWINGS

A more complete understanding of the invention can be had by reference to the following Detailed Description in conjunction with the accompanying Drawings, wherein.

DETAILED DESCRIPTION

Figure 1:
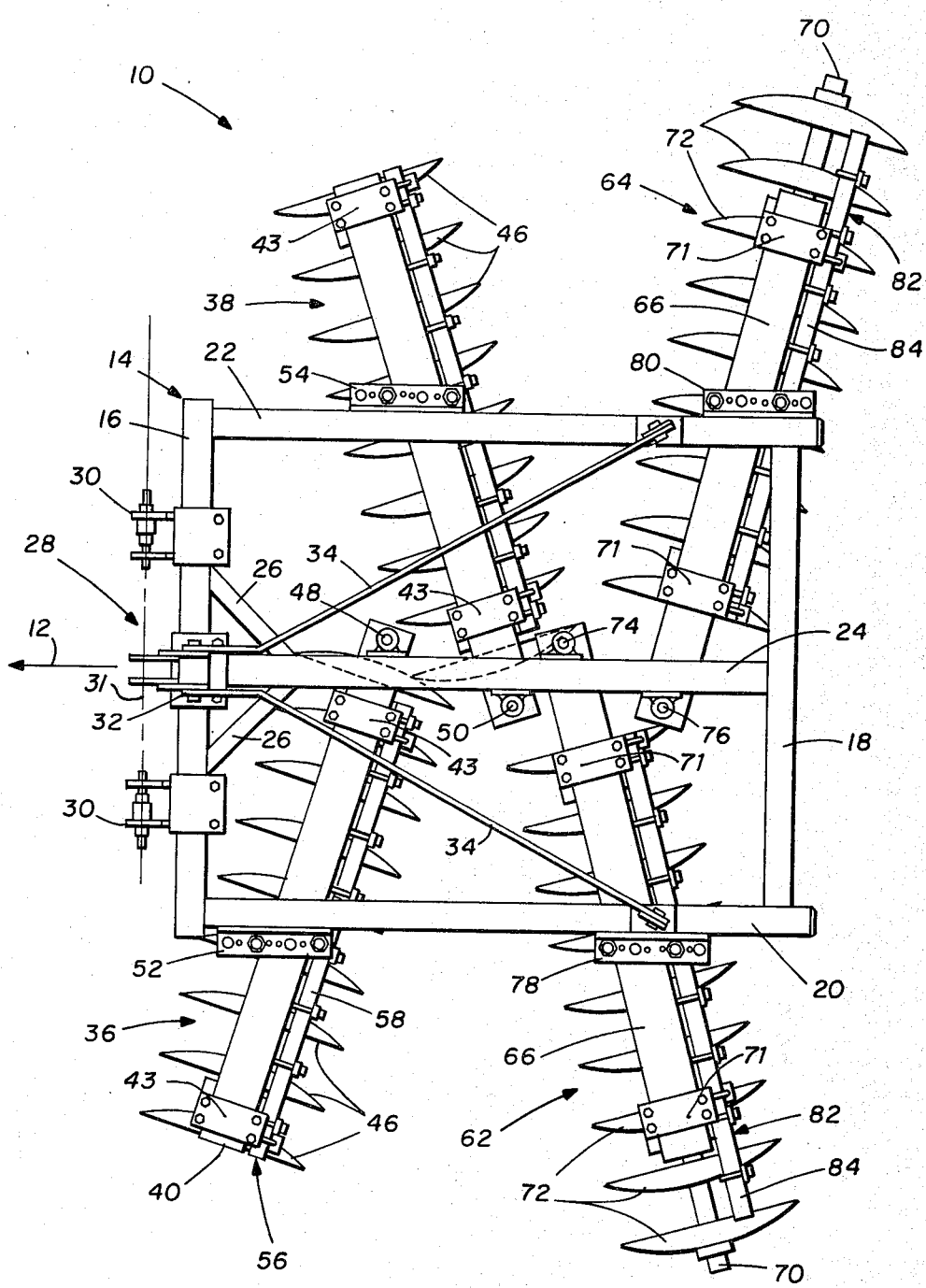
FIG. 1 is a top view of a novel disc harrow incorporating the invention.

Referring now to the Drawings wherein like reference numerals designate like or corresponding parts throughout the several views, and particularly referring to FIG. 1, there is shown an improved disc harrow 10 incorporating the invention. The disc harrow 10 is pulled in the direction of arrow 12 by a tractor or other towing vehicle (not shown). The disc harrow 10 is employed to pulverize and level a field prior to seeding. The disc harrow 10 is suitable for primary or secondary tillage, and weighs between 2000 and 6000 pounds in the preferred embodiment. As will be more fully explained hereinafter, the disc harrow 10 utilizes a novel double-offset design to effect harrowing across the entire width of the implement.

The disc harrow 10 includes a rigid frame 14. The frame 14 comprises front member 16, rear member 18, and side members 20 and 22. A longitudinal intermediate member 24 is connected between front member 16 and rear member 18. In accordance with the preferred construction, a brace 26 is secured between each side of the intermediate member 24 and the front member 16. For example, straight sections of steel tubing secured together by welding can be employed in the construction of rectangular frame 14.

Figure 2:
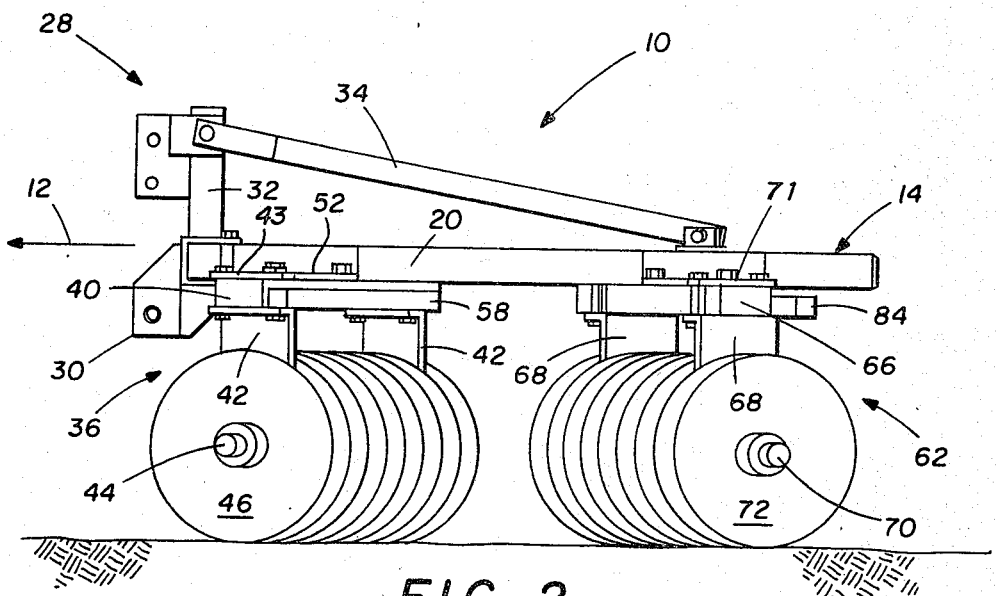
FIG. 2 is a side view of the disc harrow shown in FIG. 1, showing only the left forward and left rear gang assemblies for clarity.

Referring to FIGS. 1 and 2, the disc harrow 10 includes a hitch assembly 28 for connection to a tractor or other towing vehicle. The hitch assembly 28 includes a pair of transversely spaced apart shackles 30 mounted on the front member 16. The shackles 30 define a horizontal axis 31 and comprise two points of pivotal connection between the disc harrow 10 and a tractor (not shown). An upstanding post 32 is also mounted on the front member 16 and between shackles 30. Braces 34 are secured between the post 32 and side members 20 and 22 for purposes of reinforcement. Connection of a power hitch mechanism, such as a hydraulic actuator, between the tractor and the post 32 enables raising or lowering the disc harrow 10 relative to the ground.

Since shackles 30 define a horizontal axis 31 about which disc harrow 10 can be pivoted in the vertical direction by means of an actuator coupled between the tractor and post 32, it will be apparent that hitch assembly 28 permits the disc harrow to benefit from the weight transfer capability of the tractor. Post 32 functions as a lever arm through which force from the actuator can be applied either to lift disc harrow 10 out of the ground to shorten turnaround space and time in the field, or to push the disc harrow downward with sufficient force to maintain the ground penetration required to effect harrowing at the desired speeds. The pull-type disc harrows of the prior art, which have lacked such a hitch assembly in combination with double-offset gangs of discs like that employed in disc harrow 10, have not been able to utilize the weight transfer capability of the towing tractor, and have therefore tended to ride out of the ground and float with increasing speed. As a result, such prior pull-type disc harrows have been able to maintain the soil penetration necessary for effective harrowing only at relatively slow speeds. Pull-type disc harrows are thus confined to operation at speeds which are time consuming, and they cannot be pivoted out of complete engagement with the ground to shorten turnaround time and distance. Hitch assembly 28 enables ground engagement of disc harrow 10 to be controlled in accordance with soil conditions, tilling speed, etc.

It will thus be appreciated that hitch assembly 28 comprises a conventional 3-point type hitch permitting pivotal motion of the towed implement in the vertical direction only. Lateral motion of the towed implement is prevented. Heretofore, disc harrows suitable for field use have been of the pull type requiring more turnaround space and time. A 3-point hitch enhances control and maneuverability of the harrow. However, while a 3-point hitch is preferable, it will be understood that other suitable hitches can be employed to connect the disc harrow 10 to a towing vehicle. For example, a quick hitch can also be used with disc harrow 10.

The disc harrow 10 includes two pairs of gang assemblies arranged in tandem. The forward pair of gang assemblies 36 and 38 extend outwardly from the frame 14 and angle toward the towing direction of the disc harrow 10. The forward gang assemblies 36 and 38 are of similar construction. Each gang assembly 36 and 38 includes an outwardly extending arm 40 having two spaced apart legs 42 extending therefrom. In accordance with the preferred construction, arms 40 are formed of rectangular steel tubing and legs 42 are removably secured to the arms by clamps 43. An axle 44, on which a plurality of discs 46 are mounted, is journaled between the legs 42 of each arm 40. As illustrated, the forward gang assemblies 36 and 38 each include nine discs 46. The discs 46 are thus rotatably mounted in spaced relation along the gang assemblies 36 and 38, and can comprise dished or flat, round or cut-out type discs of any suitable number.

The inner ends of gang assemblies 38 and 38 are pivotally secured to the frame 14. Arms 40 of gang assemblies 36 and 38 are pivoted at the inner ends to the intermediate member 24 of frame 14 at points 48 and 50, respectively. It will be noted that points 48 and 50 are longitudinally spaced along the intermediate member 24. Arms 40 of gang assemblies 36 and 38 extend outwardly from points 48 and 50, respectively, and through clamps 52 and 54, respectively. The clamps 52 and 54 are of similar construction, each comprising bolts extending between a free plate and a bracket secured to the corresponding side member of the frame 14. Preferably, the brackets of clamps 52 and 54 include several sets of holes to allow for angular adjustment of the gang assemblies 36 and 38 relative to the frame 14.

As is best shown in FIG. 1, forward gang assemblies 36 and 38 are mounted in staggered relationship and offset toward one another. The forward gang assemblies 36 and 38 extend laterally outward from point positioned on opposite sides of intermediate member 24. The inner portions of the forward gang assemblies 36 and 38 thus overlap a central transverse zone to achieve continuous harrowing across the entire width of the disc harrow 10. It will be understood that this comprises a significant feature of the present invention.

Figure 3:
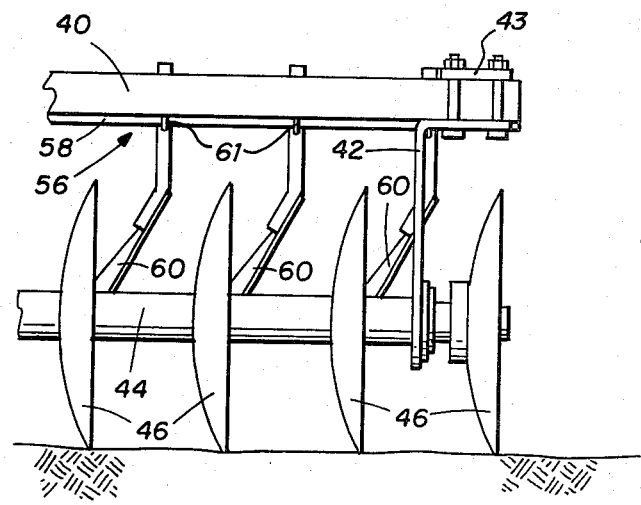
FIG. 3 is a front side view of the end portion of the front left gang assembly of the invention.

Referring to FIGS. 1 and 3, each gang assembly 36 and 38 can be provided with a scraper assembly 56, if desired. Each scaper assembly 56 includes a bar 58 secured to the arm 40 of the corresponding gang assembly 36 or 38. A plurality of moldboard type blades 60, one for each of the discs 46, are secured to each bar 58. In accordance with the preferred construction, the blades 60 are adjustably secured to bars 58, such as by means of U-bolts 61, to facilitate maintenance and positioning of the blades relative to the discs.

Figure 4:
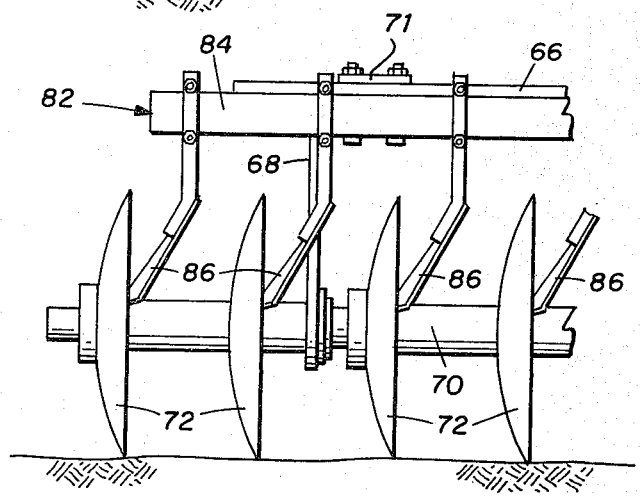
FIG. 4 is a back side view of the end portion of the rear left gang assembly of the invention.

Referring again to FIGS. 1 and 2, in conjunction with FIG. 4, the disc harrow 10 also includes a rear pair of gang assemblies 62 and 64. The rear left gang assembly 62 and the rear right gang assembly 64 extend outwardly from the frame 14 and angle away from the towing direction of the disc harrow 10. The rear gang assemblies 62 and 64 do not overlap at their inner ends and extend relatively further outwardly from the front gang assemblies 36 and 38. In all other respects, rear gang assemblies 62 and 64 are of constructions similar to front gang assemblies 36 and 38. Briefly, each rear gang assembly 62 and 64 includes an arm 66 with a pair of legs 68 extending downwardly therefrom. An axle 70 carrying a plurality of discs 72 is rotatably journaled between each pair of legs 68, which are removably secured to the arms 66 by clamps 71. As illustrated, the rear gang assemblies 62 and 64 each contain ten discs 72, although any suitable number of discs can be used. The inner ends of the arms 66 of the gang assemblies 62 and 64 are pivoted at longitudinally spaced points 74 and 76, respectively, to the intermediate member 24 of frame 14. The rear gang assemblies 62 and 64 are also secured to the frame 14 by clamps 78 and 80, respectively, each of which comprises bolts extending between a free plate and a bracket secured to the corresponding side member of the frame.

If desired, the rear gang assemblies 62 and 64 can each be equipped with a scraper assembly 82 comprising a bar 84 with a plurality of blades 88 adjustably mounted thereon for cooperation with the discs, as is best shown in FIG. 4. According to the preferred construction, the blades 86 are secured to bars 84 with U-bolts similar to U-bolts 61.

It will be apparent from the Drawing that the four gang assemblies 36, 38, 62 and 64 of disc harrow 10 are attached to frame 14 not only in a double-offset relationship, but are also grouped relatively closely together. The innermost disc of each gang assembly is proximately positioned relative to the pivot point of the other gang assembly in the same pair. For example, it will be seen that the trailing edge of the innermost disc 46 of left front disc gang assembly 36 is positioned just forward of pivot point 50 of the right front disc gang assembly 38, while the forward edge of the innermost disc of the right front disc gang assembly 38 is positioned just behind pivot point 48 of the left front disc gang assembly 36. The innermost discs 72 on rear disc gang assemblies 62 and 64 are also positioned proximate to pivot points 74 and 76 thereof. The attachment points 48, 50, 74 and 76 of disc gang assemblies 36, 38, 62 and 64, respectively, are thus grouped closely together such that each attachment point is no more than the distance corresponding to the diameter of one disc away from the next adjacent attachment point. It will also be seen that the forwardmost disc gang assembly, which is left front assembly 36, is positioned such that the outermost disc 46 thereof substantially intersects the pivot axis 31 defined by shackles 30 of hitch assembly 28 to locate pivot point 48 against which the locations of pivot points 50, 74 and 76 can then be referenced.

This arrangement of disc gang assemblies 36, 38, 62 and 64 in combination with 3-point hitch assembly 28 enables disc harrow 10 to perform with several advantages over the pull-type harrows of the prior art. Relatively close longitudinal grouping of the disc gang assemblies distributes the weight closer to hitch assembly 28 so that disc harrow 10 can be selectively pivoted upward out of ground engagement or pivotally biased downward into ground engagement with greater efficiency. More importantly, rear disc gang assemblies 62 and 64 are located closer to the front disc gang assemblies 36 and 38 such that soil turned and lifted by front discs 46 is engaged by rear discs 72 sooner before the soil can completely fall back into place, thereby achieving improving cutting and soil incorporation. The use of a 3-point hitch in combination with double-offset disc gang assemblies arranged in a relatively close grouping permits disc harrow 10 to be operated effectively at higher speeds than have been possible heretofore with the disc harrows of the prior art.

From the foregoing, it will be understood that the present invention comprises a disc harrow of the tandem type having numerous advantages over the prior art. The most significant advantage involves the fact that the soil is harrowed across the entire width of the implement without leaving an unharrowed zone or balk. This feature derives from a unique double-offset arrangement of gang assemblies. The use of a 3-point hitch in combination with double-offset gang assemblies facilitates control and maneuverability, and reduces turnaround space and time. The rugged, simplified construction facilitates maintenance and reduces costs. Other advantages will readily suggest themselves to those skilled in the art.

Although particular embodiments of the invention have been illustrated in the accompanying Drawings and described in the foregoing Detailed Description, it will be understood that the invention is not limited to the embodiments disclosed, but is intended to embrace any alternatives, modifications and rearrangements and/or substitutions of parts or elements as fall within the spirit and scope of the invention.

I claim:
1. A disc harrow, comprising:
   a rigid frame;
   3-point hitch means for pivotally connecting said frame to a tow vehicle, said hitch means including a pair of shackles and an upstanding post located between the shackles;
   a first disc gang assembly secured to said frame in a position angling forward and extending laterally outward one side of said frame;
   said first disc gang assembly being secured to said frame at inner and outer points of attachment, and including a plurality of discs of predetermined diameters mounted at intervals therealong;
   a second disc gang assembly secured to said frame behind said first disc gang assembly in a position angling forward and extending laterally outward beyond the other side of said frame;
   said second disc gang assembly being secured to said frame at inner and outer points of attachment, and including a plurality of discs of predetermined diameters mounted at intervals therealong with the innermost disc laterally overlapping the innermost disc of said first disc gang assembly to provide continuous harrowing across the combined width of said first and second disc gang assemblies;
   the inner points of attachment of said first and second disc gang assemblies to said frame being vertically aligned with the rotational axes of their respective discs and longitudinally spaced apart a distance less than one disc diameter;
   a third disc gang assembly secured to said frame behind said second disc gang assembly in a position angling rearward and extending laterally outward beyond said one side of said frame;
   said third disc gang assembly being secured to said frame at inner and outer points of attachment, and including a plurality of discs of predetermined diameters mounted at intervals therealong;
   the inner points of attachment of said second and third disc gang assemblies to said frame being vertically aligned with the rotational axes of their respective discs and longitudinally spaced apart a distance less than one disc diameter;
   a fourth disc gang assembly secured to said frame behind said third disc gang assembly in a position angling rearward and extending laterally outward beyond said other side of said frame; and
   the inner points of attachment of said third and fourth disc gang assemblies to said frame being vertically aligned with the rotational axes of their respective discs and longitudinally spaced apart a distance less than one disc diameter.

2. The disc harrow of claim 1, wherein the shackles of said 3-point hitch means define a transverse pivot axis, and wherein the outermost disc of said first disc gang assembly substantially intersects said pivot axis.

3. The disc harrow of claim 1, further including: first and second scraper assemblies associated with said first and second disc gang assemblies, respectively, for cleaning the discs thereof.

4. The disc harrow of claim 1, further including: third and fourth scraper assemblies associated with said third and fourth disc gang assemblies, respectively, for cleaning the discs thereof.

5. The disc harrow of claim 1, wherein the inner points of attachment to said frame of said first and second disc gang assemblies comprise pivots, and wherein the outer points of attachment thereof comprise means for releasably securing said assemblies to said frame in a plurality of predetermined positions to provide for angular adjustment.

6. The disc harrow of claim 1, wherein the inner points of attachment to said frame of said third and fourth disc gang assemblies comprise pivots, and wherein the outer points of attachment thereof comprise means for releasably securing said assemblies to said frame in a plurality of predetermined positions to provide for individual angular adjustment.

7. The disc harrow of claim 1, wherein said frame comprises:
 a front member;
 a rear member;
 a pair of side members interconnecting said front and rear members; and
 a longitudinal intermediate member interconnecting said front and rear members between said side members.

8. The disc harrow of claim 1, wherein said harrow weighs between 2,000 and 6,000 pounds.

9. A disc harrow, comprising:
 a rigid frame having a front member, a rear member, first and second side members interconnecting the front and rear members, and a longitudinal intermediate member interconnecting the front and rear members between the side members;
 3-point hitch means for pivotally connecting said frame to a tow vehicle, said hitch means including a pair of shackles secured to the front frame member defining a transverse pivot axis and an upstanding post secured to the front frame member between the shackles;
 a first disc gang assembly attached to the intermediate and first side frame members in a position angling forward and extending laterally outward beyond the first side frame member;
 said first disc gang assembly including a series of spaced-apart discs of predetermined diameters with the outermost disc substantially intersecting the pivot axis of said hitch means;
 a second disc gang assembly attached to the intermediate and second side frame members behind said first disc gang assembly in a position angling forward and extending laterally outward beyond the second side frame member;
 said second disc gang assembly including a series of spaced-apart discs of predetermined diameters with the innermost disc located in laterally overlapping relationship with the innermost disc of said first disc gang assembly to provide continuous harrowing across the combined width of said first and second disc gang assemblies;
 a third disc gang assembly attached to the intermediate and first side frame members behind said second disc gang assembly in a position angling rearward and extending laterally outward beyond the first side frame member;
 said third disc gang assembly including a series of spaced-apart discs of predetermined diameters thereon; and
 a fourth disc assembly attached to the intermediate and second side frame members behind said third disc gang assembly in a position angling rearward and extending laterally outward beyond the second side frame member;
 said fourth disc gang assembly including a series of spaced apart discs of predetermined diameters thereon;
 the points of attachment of said first, second, third and fourth disc gang assemblies to the intermediate frame member being vertically aligned with the rotational axes of their respective discs and longitudinally spaced apart within an overall distance no greater than three disc diameters.

10. The disc harrow of claim 9, further including:
 first and second scraper assemblies associated with said first and second disc gang assemblies, respectively, for cleaning the discs thereof.

11. The disc harrow of claim 9, further including:
 third and fourth scraper assemblies associated with said third and fourth disc gang assemblies, respectively, for cleaning the discs thereof.

12. The disc harrow of claim 9, wherein the points of attachment to the intermediate frame member of said first, second, third and fourth disc gang assemblies comprise pivots, and wherein the points of attachment thereof to the side frame members comprise means for releasably securing said assemblies to said side frame members in a plurality of predetermined positions to provide for individual angular adjustment.

* * * * *

UNITED STATES PATENT AND TRADEMARK OFFICE
CERTIFICATE OF CORRECTION

PATENT NO. : 4,271,912

DATED : June 9, 1981

INVENTOR(S) : John V. Frye

It is certified that error appears in the above—identified patent and that said Letters Patent is hereby corrected as shown below:

Column 1, line 34, "balk of" should read -- balk or --.

Signed and Sealed this

Tenth Day of November 1981

[SEAL]

Attest:

GERALD J. MOSSINGHOFF

Attesting Officer

Commissioner of Patents and Trademarks